(No Model.)
L. ANIDJAH.
FIRE ESCAPE.
No. 418,879.　　　　　　　　　　Patented Jan. 7, 1890.
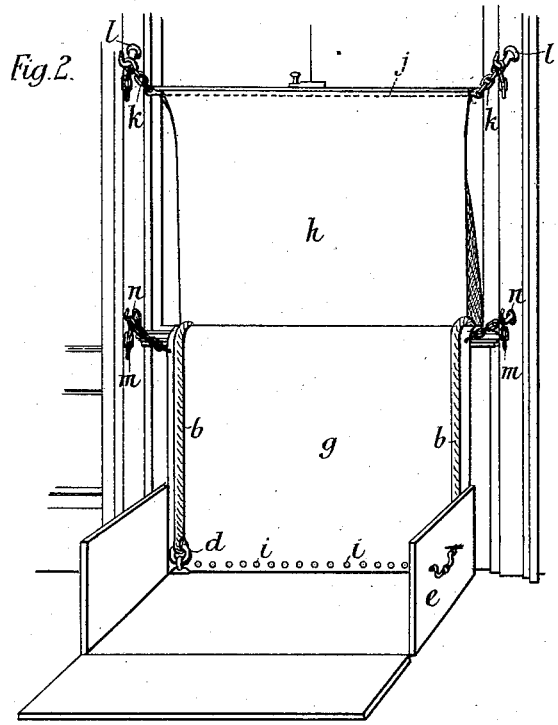
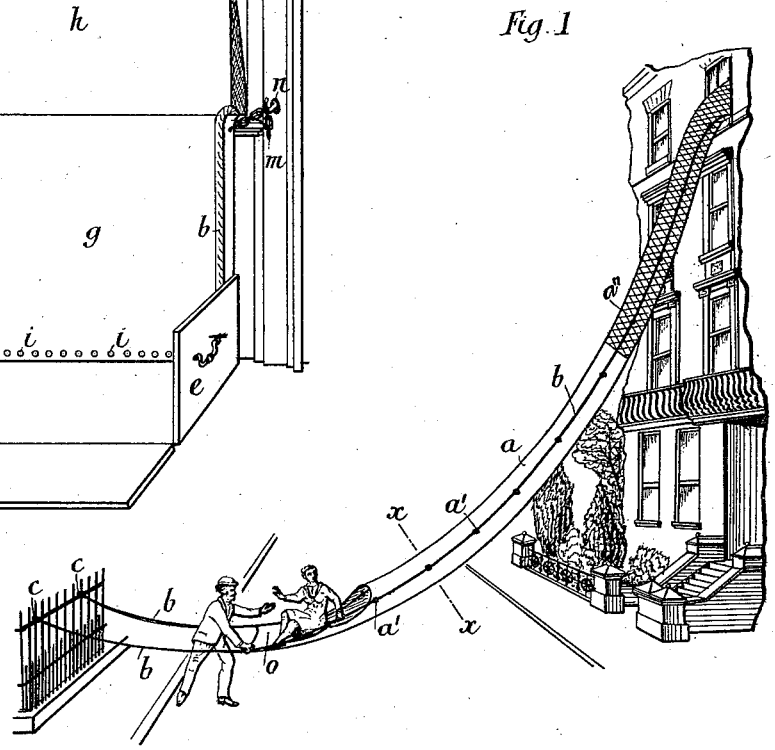
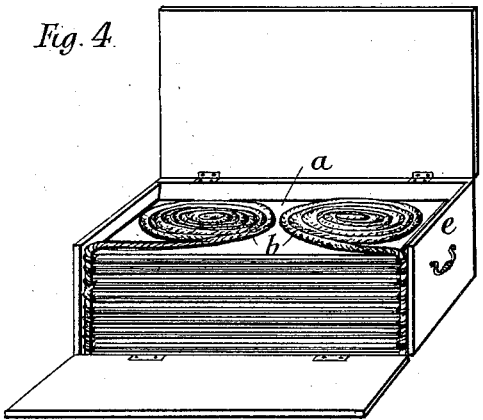
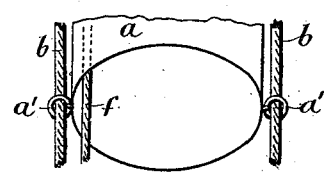

UNITED STATES PATENT OFFICE.

LEWIS ANIDJAH, OF LONDON, ENGLAND.

FIRE-ESCAPE.

SPECIFICATION forming part of Letters Patent No. 418,879, dated January 7, 1890.

Application filed March 23, 1889. Serial No. 304,404. (No model.) Patented in England July 26, 1888, No. 10,840.

*To all whom it may concern:*

Be it known that I, LEWIS ANIDJAH, a subject of the Queen of Great Britain, residing at London, England, have invented a new and useful Improved Portable Fire-Escape, (for which a patent was granted to me in Great Britain, No. 10,840, dated July 26, 1888,) of which the following is a specification.

My invention relates to an improved portable fire-escape which can be readily fixed by the occupants of a house or other building, and it comprises the improvements hereinafter described.

In the accompanying drawings, Figure 1 is an elevation in perspective of my improved fire-escape in position for use. Fig. 2 shows in perspective the mouth at the upper end of the chute. Fig. 3 is a section on the line $xx$, Fig. 1; and Fig. 4 shows in perspective the apparatus packed in a box.

$a$ is a canvas chute, which is open at both ends, and which is rendered uninflammable by any suitable chemical process in a well-known manner. In order to prevent the canvas chute from carbonizing in the event of the flames striking the said chute, the upper part of the same—say for half the length of the chute—is covered with netted wire $a''$, covered with hemp, flax, or other material rendered uninflammable by chemical means.

$b\ b$ are guide-ropes having eyes $c\ c$ plaited or otherwise formed at one end, and which at the other end are secured to hooks or rings $d\ d$ at the bottom of a box $e$, as shown in Fig. 2, the said box being adapted to receive the apparatus when folded. Rings $a'$ $a'$, attached to the chute $a$, are adapted to slide upon the guide-ropes.

$f$ is a line or cord, which is located inside the chute to enable an invalid or other person to be lowered down the chute.

The upper end of the chute is formed with two flaps $g\ h$, the lower of which is permanently affixed to the said box by screws $i\ i$ or the like, while the upper flap $h$ has an iron or steel bar $j$ inserted therein, with links $k\ k$ at each end, the said links being adapted to be placed onto hooks $l\ l$ on the window-frame, so that the mouth of the chute is kept open. I also arrange hooks $m\ m$ at or near the level of the window-sill, to which chains $n\ n$, attached to the flap $g$, may be connected to further insure that the mouth of the chute will be kept open. The advantage of this arrangement is that I am enabled to attach the chute to the window-frame in such a manner that the opening is entirely covered, thus affording no space at the sides through which a person could fall or be thrown.

In using my apparatus the box containing the same is placed beneath a window, as shown in Fig. 2, and the guide-ropes $b\ b$ are then thrown into the streets, the eyes $c\ c$ being secured to the railings of the houses opposite or to other convenient objects. The chute $a$ is then thrown from the window, and by means of the rings $a'\ a'$ travels along the guide-ropes $b\ b$, till it assumes the position shown in Fig. 1, when the apparatus is ready for use. At the lower end of the chute $a$ is formed a hammock $o$, as shown in Fig. 1, on which persons descending the chute are received. This hammock is provided at the sides with handles to enable by-standers to hold the hammock in an extended position. In case there is no one at hand to secure the ropes $b\ b$ after they are thrown from the window, a person by passing his arms through the eyes $c\ c$ can be lowered to the ground. I find it advantageous to arrange a strap in connection with one of the eyes, which strap can be passed around the body of the person to be lowered to prevent him from falling in case his arms should slip out of the eyes.

Although in the drawings I have shown a box $e$ for containing the apparatus when not in use, it is to be understood that the apparatus may be arranged in a receptacle in a couch, easy-chair, or other piece of furniture which in case of fire may be placed beneath an open window.

I claim—

1. In a fire-escape, the combination, with the receptacle or box for containing the same, of a chute having one edge secured to said box within the same and another edge provided with a cross-bar having links at each end of the same for engaging supporting projections, said chute being also provided at each side of the same and intermediate said edges with links for engaging supporting projections, whereby said chute may be disengaged from said supporting projections and folded within said box, substantially as described.

2. In a fire-escape, the combination, with a box or receptacle for containing the same, having its front side pivotally secured at its lower edge, of a chute, two sets of supporting-hooks for said chute located in different horizontal planes, said chute being secured at one edge to said box within the same and having another edge provided with a cross-bar having links to engage one set of supporting-hooks, and links intermediate said edges for engaging the other set of hooks, whereby said chute may be removed from said box, supported in position, and the front side of the said box turned down to give access to the mouth of said chute, substantially as described.

LEWIS ANIDJAH.

Witnesses:
JOHN E. BONSFIELD,
EDWIN CHURCHER.